(12) United States Patent
Saastamo (10) Patent No.: US 9,840,372 B2
(45) Date of Patent: **\*Dec. 12, 2017**

(54) WORKPIECE SINGULATOR WITH ADJUSTABLE STAIR DEPTH

(71) Applicant: USNR, LLC, Woodland, WA (US)

(72) Inventor: Petri Saastamo, Woodland, WA (US)

(73) Assignee: USNR, LLC, Woodland, WA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 15/153,045

(22) Filed: May 12, 2016

(65) Prior Publication Data

US 2016/0257497 A1    Sep. 8, 2016

Related U.S. Application Data

(63) Continuation of application No. 14/710,316, filed on May 12, 2015, now Pat. No. 9,352,909.

(60) Provisional application No. 61/992,740, filed on May 13, 2014.

(51) Int. Cl.
*B65G 47/00* (2006.01)
*B65G 25/08* (2006.01)
*B65G 47/14* (2006.01)

(52) U.S. Cl.
CPC ......... *B65G 25/08* (2013.01); *B65G 47/1471* (2013.01); *B65G 2201/0282* (2013.01); *B65G 2812/09* (2013.01)

(58) Field of Classification Search
None
See application file for complete search history.

(56) References Cited

U.S. PATENT DOCUMENTS

| 8,516,965 B2 * | 8/2013 | Pier | E01B 29/26 |
| | | | 198/396 |
| 9,352,909 B2 * | 5/2016 | Saastamo | B65G 25/08 |

\* cited by examiner

*Primary Examiner* — William R Harp
(74) *Attorney, Agent, or Firm* — Schwabe Williamson & Wyatt, P.C.

(57) ABSTRACT

Embodiments of the present disclosure provide a workpiece singulator with one or more movable stairs. A first one of the movable stairs may include an outer step member and an inner step member that is positioned between the outer step member and a second one of the movable stairs. The step members may be movable synchronously as a single stair to transport larger workpieces and asynchronously to transport smaller workpieces on the outer step member. Optionally, the workpiece singulator may further include a sensor configured to detect the size and/or position of a workpiece. In some embodiments, the workpiece singulator may be coupled with a controller configured to control the position of the outer step member independently of the position of the inner step member. In various embodiments, a workpiece singulator as disclosed herein may be operable to selectively singulate workpieces of different sizes.

15 Claims, 6 Drawing Sheets

WORKPIECE SINGULATOR WITH ADJUSTABLE STAIR DEPTH

CROSS REFERENCE TO RELATED APPLICATION

The present application claims priority to U.S. patent application Ser. No. 14/710,316, filed May 12, 2015, which claims the benefit of U.S. Patent Application No. 61/992,740, filed May 13, 2014, both titled "WORKPIECE SINGULATOR WITH ADJUSTABLE STAIR DEPTH," the entire disclosures of which are incorporated by reference herein.

BACKGROUND

Step feeders are used to singulate and transfer workpieces from one location to another. Some step feeders include moving stairs interposed between fixed stairs, with the moving stairs driven by a motor and crank shaft. A log, cant, or other workpiece is deposited onto the lowest of the moving stairs, and the moving stair is driven upward to lift the workpiece to a fixed stair. The next moving stair lifts the workpiece from the fixed stair to the next consecutive fixed stair, and so on, until the workpiece reaches the desired location. Other step feeders have two sets of moving stairs. In step feed feeders of this type, one set of moving stairs is moved up while the other set is moved down.

In both cases, the moving stair that raises the workpiece has a fixed depth. Shallow stairs are suitable for singulating small workpieces, but larger workpieces may fall off the stairs during transport. Deeper stairs are more useful for singulating larger workpieces, but they may allow smaller workpieces to be carried on the moving stair in groups of two or more, making the stairs less suitable for singulating small workpieces.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments of methods, apparatuses, and systems for singulating workpieces are provided herein. In various embodiments, the workpieces may be logs, cants, boards, or other such items. In exemplary embodiments, a computing device may be endowed with one or more components of the disclosed apparatuses and/or systems and may be employed to perform one or more methods as disclosed herein.

Embodiments of the present disclosure provide a workpiece singulator with a set of movable stairs. In various embodiments, a workpiece singulator may have a first, a second, and a third movable stair. Each of the movable stairs may have a corresponding positioning range. The upper end of the range may be represented by an extended position, and the lower end of the range may be represented by a retracted position. Optionally, the positioning ranges of consecutive movable stairs may meet or overlap one another. For example, when the first movable stair is in the extended position and the second movable stair is in the retracted position, the workpiece support surfaces of the first and second movable stairs may define an inclined plane. Similarly, when the second movable stair is in the extended position and the third movable stair is in the retracted position, the workpiece support surface of the second and third movable stairs may define another inclined plane. Workpieces may be moved upwardly on one movable stair onto the next consecutive movable stair.

In various embodiments, a first one of the movable stairs may include a first step member and a second step member. The first and second step members may be coupled with corresponding drives that are independently operable to drive the first step member independently of the second step member. One or more of the other movable stairs may also include two or more step members that are movable independently of one another.

In some embodiments, one or both of the drives may be selectively operable in a first mode and in a second mode. In the first mode, the second step member may be driven synchronously with the first step member, such that the step members collectively function as the movable stair, and the effective stair depth of the movable stair is equal to the combined depths of the step members. In the second mode, the second step member may be driven asynchronously (e.g., with the second step member remaining stationary), such that the first step member functions as that movable stair, and the effective depth of that movable stair is equal to the depth of the first step member. Optionally, while operating in the second mode the second step member may be positioned at the same or similar level as the next consecutive stair/step member.

In various embodiments, the first and second step members may be (or may include) platforms that are independently movable. The first step member may be the "outer" first platform of the movable stair and the second step member may be the "inner" second platform of the movable stair. Thus, the second step member may be disposed between the first step member and the next consecutive movable stair. In some embodiments, the movable stair may include one, two, three, or more than three additional platforms between the first step member and the second step member. The first, second, and/or additional platforms may have corresponding workpiece support surfaces, such as the top end surfaces of the platforms. Optionally, one or more of the additional platforms may be coupled with a corresponding drive configured to move the additional platform(s) independently of the first and second platforms. In some embodiments the workpiece singulator may have one or more additional movable stairs that include corresponding first, second, and/or additional step members.

In various embodiments, the step members may have workpiece support surfaces that are inclined relative to a horizontal plane, such that the distal end of the workpiece support surface is elevated relative to the proximal end of the workpiece support surface. The inclined angle of the workpiece support surfaces may help to prevent accidental dislocation of the workpieces from the stairs due to gravity and aid the movement of the workpieces toward the next consecutive stair and/or the delivery location. Likewise, the supply location may be inclined to encourage movement of the workpieces onto the bottom-most stair. As a workpiece on a movable stair reaches the next consecutive stair, the workpiece may slide toward the proximal end of the workpiece support surface and onto the next consecutive stair.

In various embodiments, the step members of a movable stair may be driven independently of one another. For example, the first and second step members of a movable stair may be driven independently by a drive assembly that includes a first drive coupled with the first step member and a second drive coupled with the second step member. In some embodiments, each of the step members of two or more movable stairs may have a corresponding drive and be driven independently of the other step members. Alternatively, in other embodiments each of the step members of a movable stair may be driven independently of one another, but in concert with the corresponding step member(s) of another one or more of the movable stairs. For example, the first step member of one movable stair and the first step member of another movable stair may be driven by the first drive, and the second step members of those movable stairs may be driven by a second drive. In such embodiments, the first step members may be linked, such as by a beam, skid, or other type of support, and the second step members may be linked in the same or similar manner. The first and second drives may be coupled with the linkage to drive the corresponding step members. Optionally, the link may be adjustable and/or removable to allow separate actuators to be coupled with some or all of the step members.

In some embodiments, the workpiece singulator may include a controller that is configured to control the drive assembly and drives thereof. In other embodiments, the workpiece singulator may include a sensor coupled with the controller and configured to detect the presence and/or size of a workpiece on or near the movable stairs. Optionally, the controller may include a programmable logic controller (PLC), a computer, or both. For example, the controller may include a computing device endowed with instructions that are operable, upon execution by a processor, to cause the computing device to send instructions to the controller based at least on data from the sensor.

In operation, a movable stair or one or more of the step members thereof may be driven along a reciprocating path from a first level (e.g., a workpiece loading level) to a next consecutive second level (e.g., the level of the next consecutive step member or movable stair). In various embodiments, the step members may be moved independently of one another, such that the step members of a movable stair can be repositioned either synchronously or asynchronously as desired. This may allow the workpiece singulator to be used in one mode to singulate larger workpieces and in another mode to singulate small workpieces (e.g., by using only the first step member of the movable stair to receive and transport the workpiece to a next level). In some embodiments, a portion of the workpiece singulator may be operable in one mode while another portion of the workpiece singulator is operable in the other mode. For example, the bottom-most movable stair(s) may be operated synchronously to lift large or multiple small workpieces, and the upper-most movable stair(s) may be operated asynchronously to singulate the workpieces and/or remove workpieces exceeding a particular size.

In various embodiments, one or more workpieces may be delivered to a loading area. One or more of the step members of the first movable stair may be moved downwardly to the retracted position to engage one of the workpieces on the support surfaces of the step member(s). The step member(s) may be driven upwards toward the extended position. As the workpiece is raised on the support surface(s) of the step member(s), the workpiece may be supported against the outer surface of the next consecutive step member(s) until the workpiece reaches the support surface of the next consecutive step member(s). The inclined angle of the support surfaces may help the workpiece to slide or roll onto the support surface of the next consecutive step member(s), which will raise the workpiece to the next level, and so on, until the workpiece reaches the delivery location.

In various embodiments, the receiving location of the step feeder may be at any height relative to the delivery location of the step feeder (that is, where the step feeder discharges or delivers singulated workpieces). For example, in some embodiments, the receiving location and the delivery location may be at the same height relative to the ground. In other embodiments, the receiving location may be at a different height than the delivery location, such as higher or lower than the delivery location.

Figure 1A:
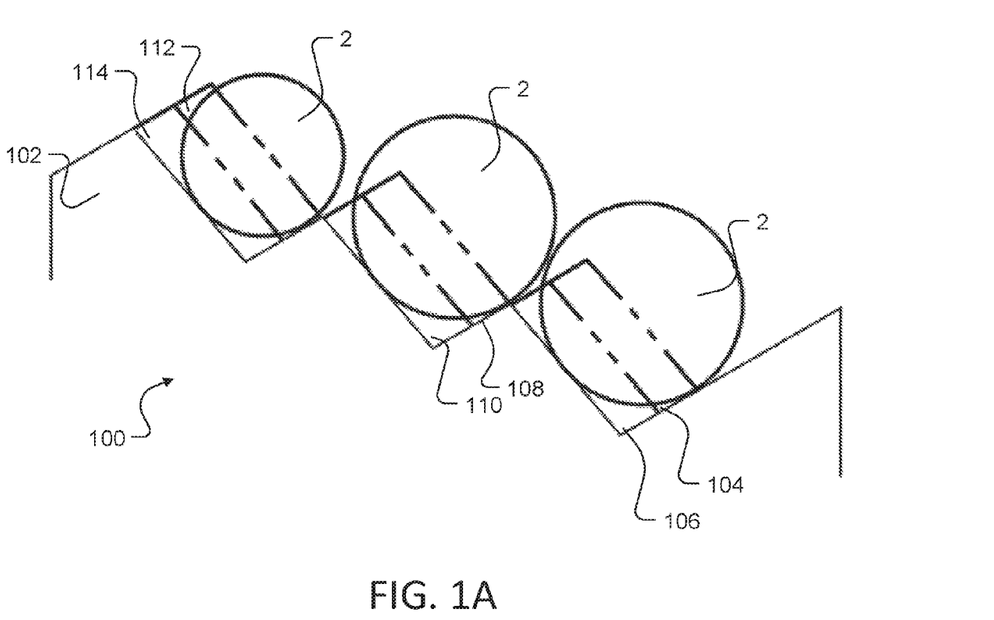
FIGS. 1A-1B illustrates a schematic side view of a workpiece singulator with variable stair depth.
Figure 1B:
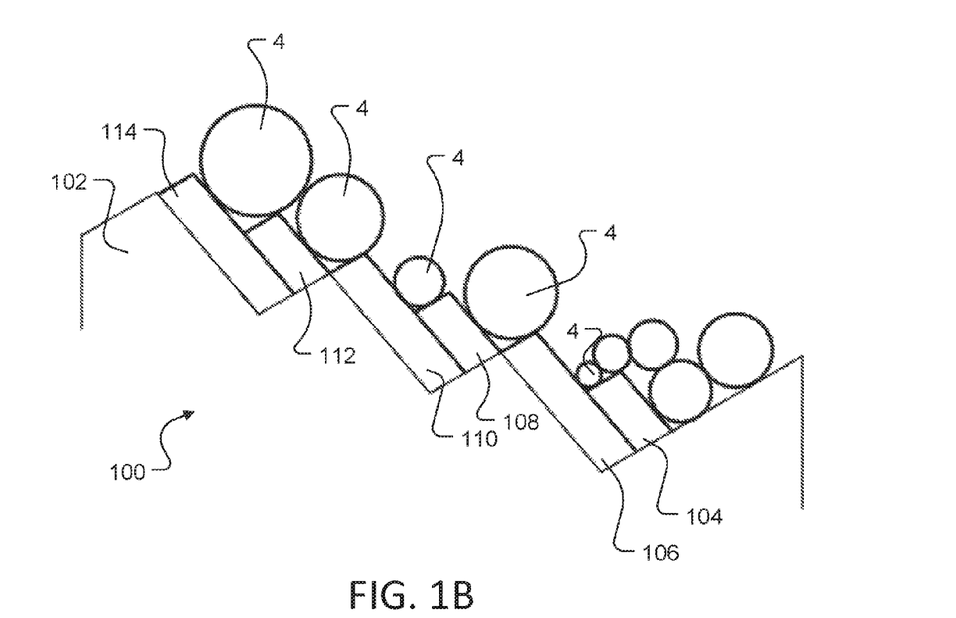
Figure 2A:
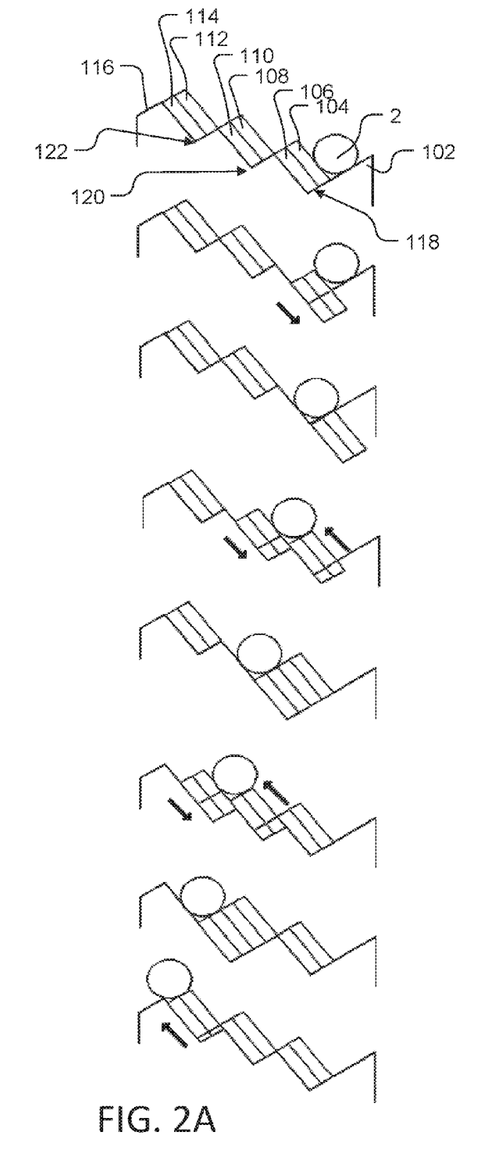
FIGS. 2A-2B illustrate schematic side views of operations of a workpiece singulator with variable stair depth.
Figure 2B:
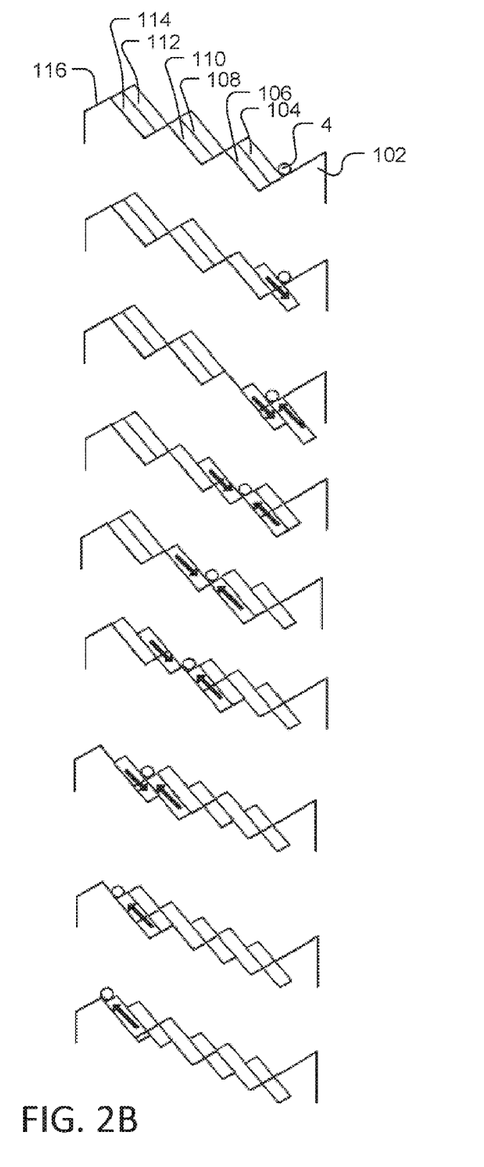

FIGS. 1A-1B illustrate side views of a workpiece singulator with variable stair depth, and FIGS. 2A-2B illustrate schematic side views of operations of a workpiece singulator with variable stair depth, all in accordance with various embodiments.

Referring first to FIGS. 1A-2A, workpiece singulator 100 may include a frame 102 with a set of movable stairs. Each of the movable stairs may include two or more step members. In the illustrated embodiment, a first movable stair includes a first step member 104 and a second step member 106, a second movable stair includes a third step member 108 and a fourth step member 110, and a third movable stair includes a fifth step member 112 and a sixth step member 114. However, in other embodiments a movable stair may have only one step member or three or more step members.

In various embodiments, workpiece singulator 100 may be operable in one mode to singulate relatively large workpieces 2 (see e.g., FIGS. 1A and 2A) and in another mode to singulate smaller workpieces 4 (see e.g., FIGS. 1B and 2B). While workpieces 2 and 4 are illustrated as logs, it is to be understood that workpiece singulators as described herein may also be used to singulate other workpieces such as cants, boards, flitches, stems, or other such items.

As shown for example in FIGS. 1A and 2A, in one mode the step members of a movable stair may be used synchronously as a unit to move large workpieces from one level to another. As shown for example in FIGS. 1B and 2B, in another mode the step members of a movable stair may be moved/positioned asynchronously to move smaller workpieces. In some embodiments, the outer-most step may be moved between the retracted position and the extended position of that movable stair. Alternatively, the first/outer-most step may be moved between the retracted position and an intermediate position (e.g., one half or one third of the range of that movable stair) and the second/inner-most step may be moved between the extended position and the same or other intermediate position, as shown for example in FIG. 2B, to transport a smaller workpiece to the next consecutive stair.

Figure 3:
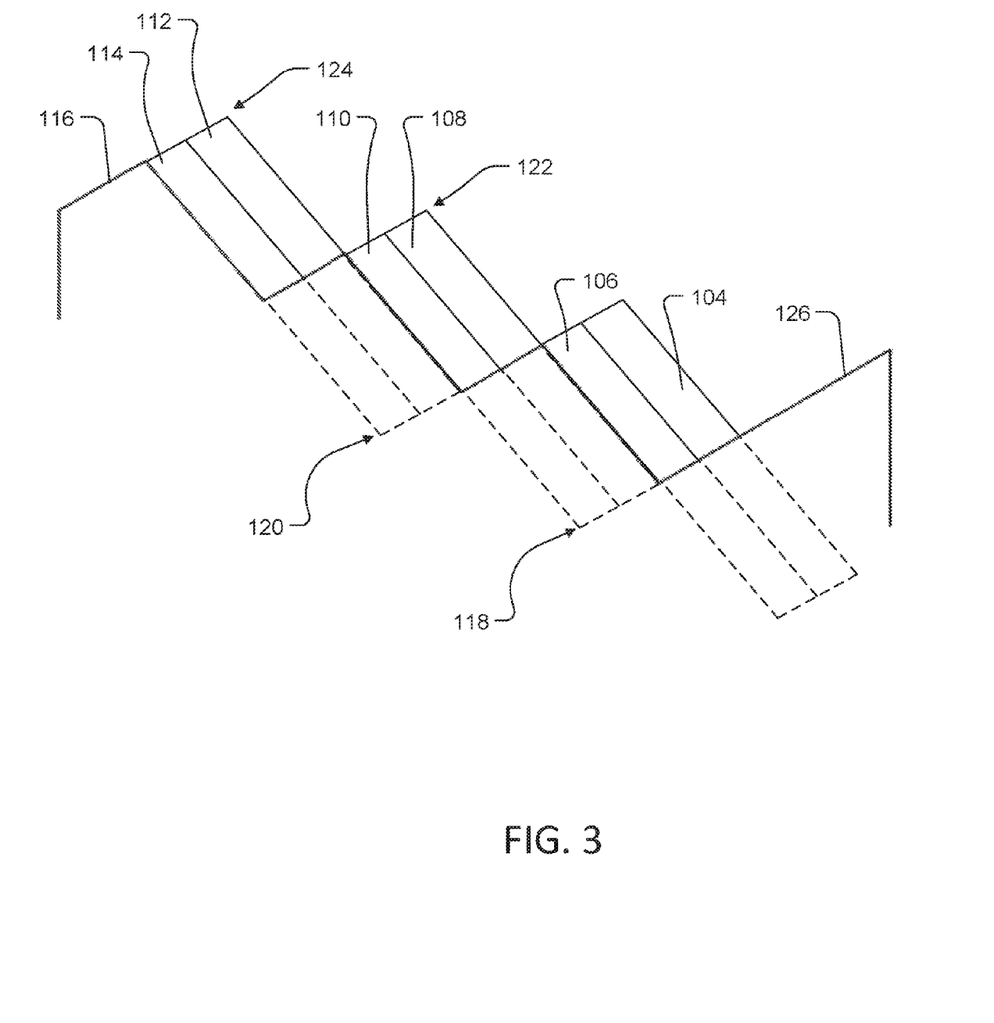
FIG. 3 illustrates a schematic side view of movable stair ranges.
Figure 4A:
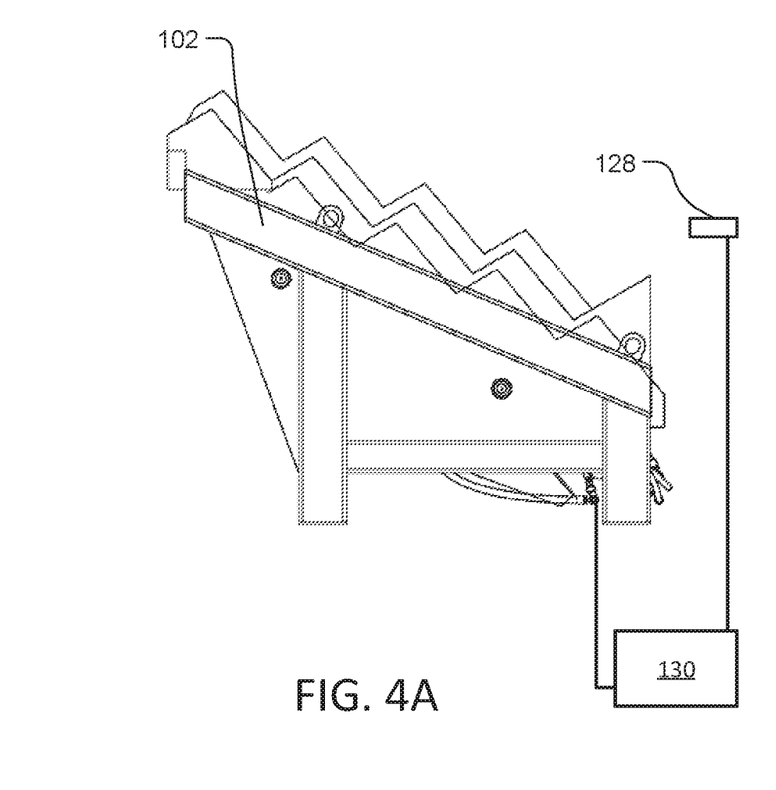
FIGS. 4A-4B illustrate schematic side views of workpiece singulator systems.
Figure 4B:
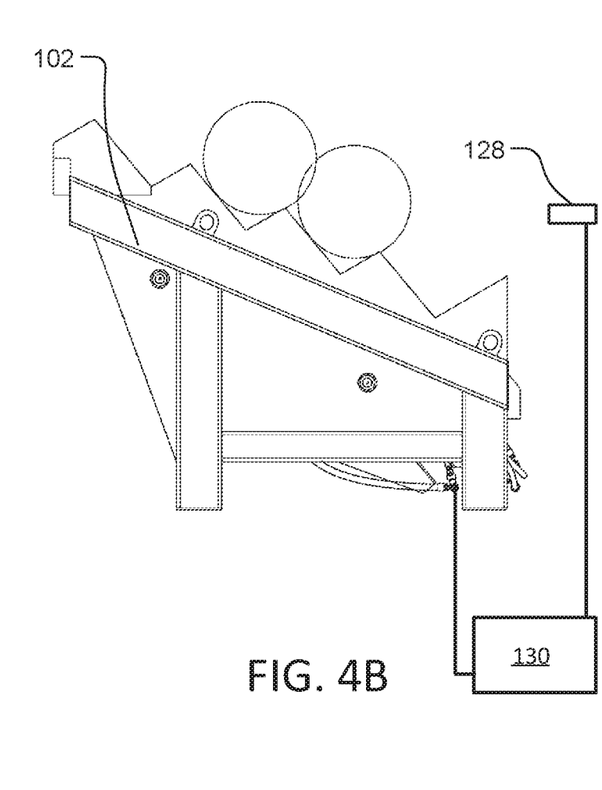

FIG. 3 illustrates a schematic diagram of movable stair ranges, in accordance with various embodiments. The movable stairs may be operated to move workpieces (e.g., workpieces 2 and/or 4) from a loading area 126 to a destination area 116. In the illustrated embodiment, each of the step members 104, 106, 108, 110, 112, and 114 are movable between a retracted position (shown in dashed lines) and an extended position. The workpiece support surfaces of step members 104 and 106 are at a first level 118 while in the retracted position, and at a second level 120 while in the extended position. The workpiece support surfaces of step members 108 and 110 are at the second level 120 while in the retracted position, and at a third level 122 while in the extended position. The workpiece support surfaces of step members 112 and 114 are at the third level 122 while in the retracted position, and at a fourth level 124 while in the extended position.

FIGS. 4A-4B and 5A-5C illustrate schematic side views of workpiece singulator systems, all in accordance with various embodiments. In some embodiments, a controller 130 may be operatively coupled with, and configured to control the positions of, the movable stairs/step members. Optionally, one or more sensors 128 may be operatively coupled with controller 130, and controller 130 may be configured to control the positions of one or more of the step members based at least on data from the sensor(s) 128. Sensor(s) 128 may include, but is not limited to, one or more photo-eyes, cameras, scanners, or any other devices suitable for detecting a position and/or size of a workpiece.

In various embodiments, as shown for example in FIGS. 5A-D, an actuator 132 may be coupled with one or more of the step members, and controller 130 may be operatively coupled with actuator(s) 132. Again, one or more sensor(s) 128 may be coupled with controller 130.

In some embodiments, a first actuator 132 may be coupled with each outer-most step member (e.g., step members 104, 108, and 112) and configured to control those step members, and a second actuator 132 may be coupled with each inner-most step member (e.g., step members 106, 110, and 114) and configured to control those step members independently of the outer-most step members. Controller 130 may be configured to control the first and second actuators 132 to move the step members of each movable stair in unison (e.g., step members 104 and 106 moved together, step members 108 and 110 moved together, and step members 112 and 114 moved together) to move larger workpieces. Controller 130 may also be configured to control the first and second actuators 132 to move the outer-most step members of each stair asynchronously with the corresponding inner-most step members to move smaller workpieces.

Figure 5A:
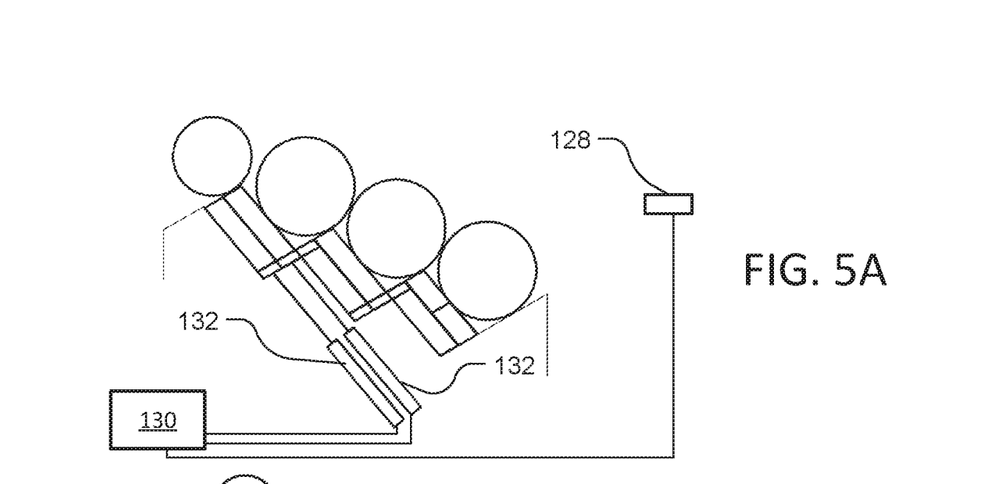
FIGS. 5A-5D illustrate schematic side views of workpiece singulator systems, all in accordance with various embodiments.
Figure 5B:
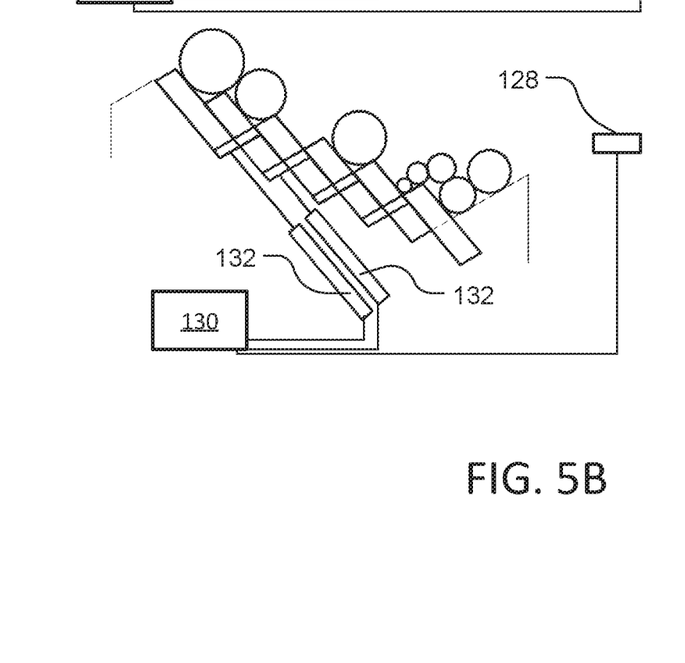
Figure 5C:
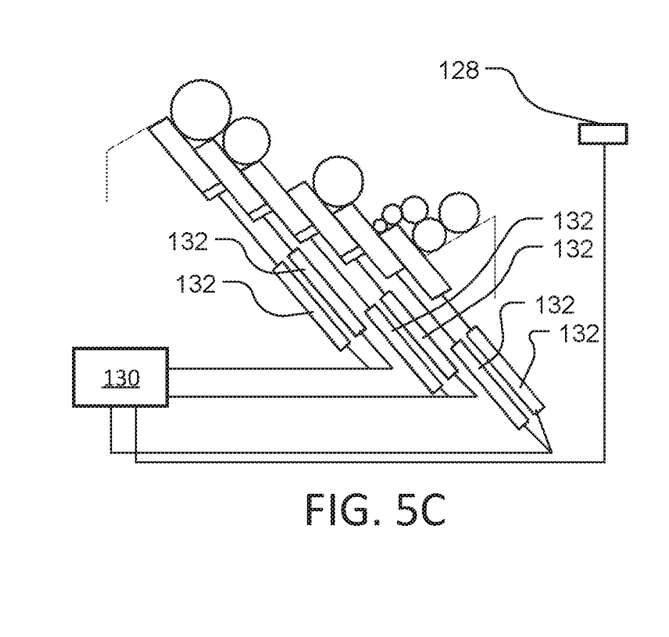

In other embodiments, as shown for example in FIG. 5C, some or all of the step members may be independently coupled with corresponding actuators 132. Controller 130 may be coupled with, and configured to control, each of the actuators 132. Optionally, controller 130 may be configured to determine, based on data from sensor 128, which of the two modes to use. For example, controller 130 may be configured to determine, based on data from sensor 128, that some or all of the workpieces in loading area 126 are smaller workpieces. In response to the determination, controller 130 may operate the workpiece singulator in the small workpiece mode, such that the step members of a movable stair are moved asynchronously. Controller 130 may also be configured to determine, based on data from sensor 128, that some or all of the workpieces in loading area 126 are larger workpieces. In response to the determination, controller 130 may operate the workpiece singulator in the large workpiece mode, such that the step members of a movable stair are moved synchronously as a single unit. Alternatively, controller 130 may be configured to operate the workpiece singulator in response to input/control by a human operator. For example, controller 130 may be configured to operate the workpiece singulator in a mode selected by a human operator, or may have one or more controls usable by a human operator to control one or more of the step members/movable stairs.

In some embodiments, actuators 132 may be (or may include) hydraulic, pneumatic, and/or electric positioning cylinders. In other embodiments, actuators 132 may include rotary actuators with linkages configured to convert rotary motion to linear motion (e.g., crankshafts driven by electric drives or other types of drives). The number, type, and arrangement of actuators 132 may vary among embodiments, and any suitable type of actuators known in the art may be used to drive the step members.

The controller 130 may be configured to selectively operate the step member(s) of one or more of the movable stairs in a small workpiece mode and in a large workpiece mode. In the large workpiece mode, controller 130 may be configured to move all of the step members of a given movable stair together as a single unit to support and raise a relatively large workpiece. In the small workpiece mode, controller 130 may be configured to move fewer than all of the step members of a given movable stair (e.g., only the outer-most step member) to support and raise a smaller workpiece. Optionally, the controller 130 may be configured to operate the outer-most step member of a movable stair to engage and raise the smaller workpiece along part of the range of that movable stair (e.g., from first level 118 to half or one-third the distance between first level 118 and second level 120), and to operate the inner-most step member to engage and raise the workpiece the remaining distance to the next level (e.g., to second level 120). Alternatively, controller 130 may be configured to operate the outer-most step member of a movable stair to engage and raise the smaller workpiece from one level (e.g., first level 118) to the next level (e.g., second level 120).

Figure 5D:
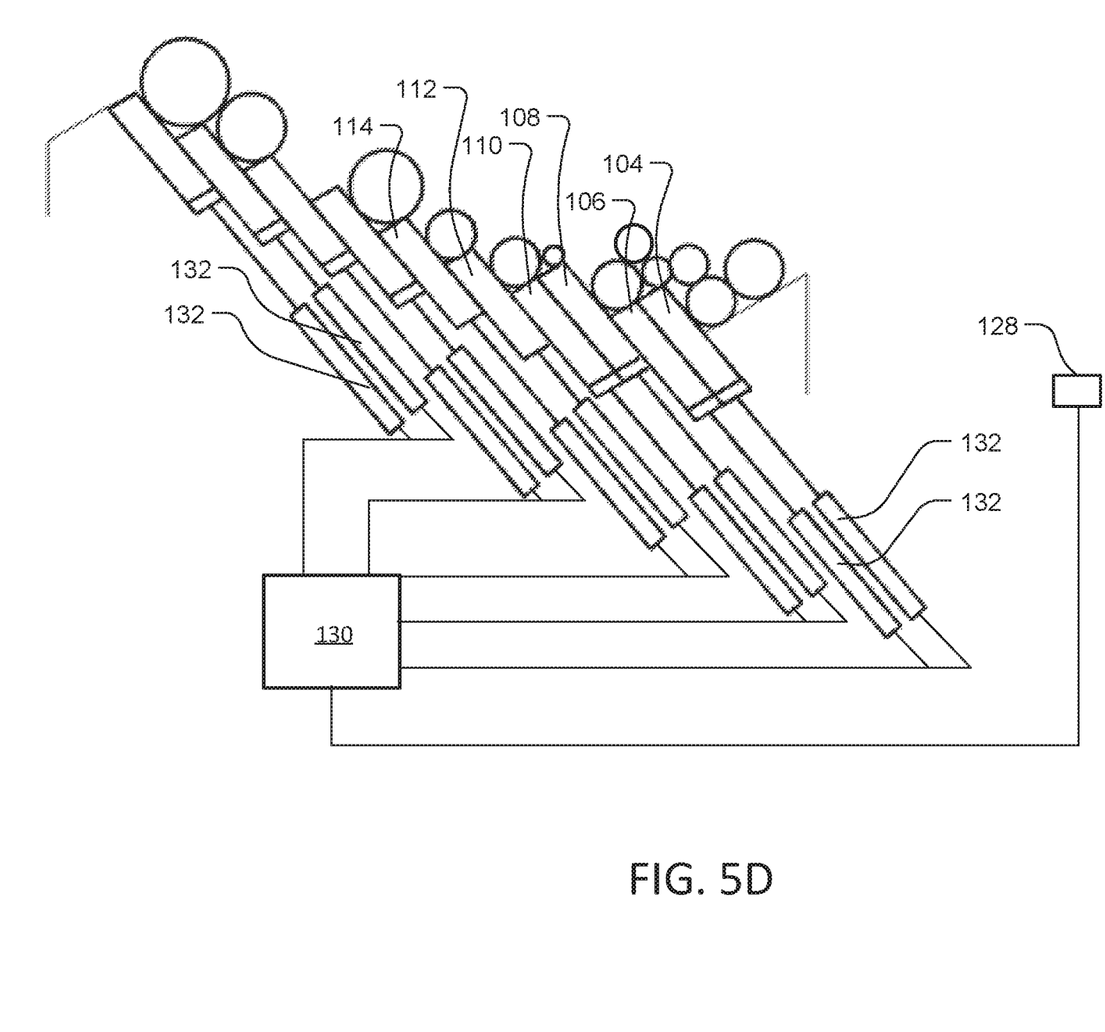

In various embodiments, the workpiece singulator may be operable in a combination mode, in which the step members of at least one of the movable stairs are operated synchronously (as in large workpiece mode) while the step members of other movable stairs are operated asynchronously and/or independently (as in small workpiece mode). An embodiment of a workpiece singulator operating in combination mode is shown in FIG. 5D. In some embodiments, operating in combination mode involves operating the step members of the bottom-most movable stair(s) in large workpiece mode while operating the step members of the remaining movable stair(s) in small workpiece mode. This may allow the bottom-most movable stair to collect and raise multiple logs (e.g., from a log pile) in a single pass. Optionally, one or more of the other movable stairs may also be operated in large workpiece mode to facilitate the removal of any logs that were not stably positioned on the bottom-most stair (e.g., a log that was resting on other logs on the stair), allowing them to fall back onto the bottom-most stair or onto the pile of logs. The upper-most movable stair(s) operating in small log mode may singulate the logs. Operating the workpiece singulator in combination mode may help to provide a more constant rate of workpiece flow (e.g., by reducing the number of empty movable stairs) and/or reduce the risk of damage to the workpieces (e.g., by encouraging unstable workpieces to fall before they the upper movable stairs).

In other embodiments, controller 130 may be configured to control the step members based at least in part on data from sensor 128 and/or input from a human operator. For example, controller 130 may be configured to accept an input from a human operator that indicates a desired log size range (e.g., smaller logs or larger logs), and control the step members according to the corresponding mode. As another example, controller 130 and/or actuators 132 may be configured to be directly controlled by a human operator, such as by way of one or more buttons, switches, or other types of input controls.

In some embodiments, the workpiece singulator may be configured to move workpieces onto the destination area 116 (e.g., a delivery platform, conveyor, or bin) one at a time. In other embodiments, controller 130 may be selectively operable to move smaller workpieces onto the destination area 116 either one at a time (e.g., in small workpiece mode) or two or more at a time (e.g., in large workpiece mode).

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A workpiece singulator, comprising:
a set of movable stairs, wherein the set of movable stairs includes a first movable stair configured to transport a workpiece from a first level to a second level, the first movable stair having a first step member with a first workpiece support surface and a second step member with a second workpiece support surface, the first and second step members being movable along generally parallel paths, and a second movable stair configured to transport the workpiece from the second level to a third level, the second movable stair having a third step member with a third workpiece support surface and a fourth step member with a fourth workpiece support surface, the second step member being disposed between the first step member and the second movable stair, and the third step member being disposed between the second step member and the fourth step member; and
a drive assembly having a first drive coupled with the first step member, a second drive coupled with the second step member, a third drive coupled with the third step member, and a fourth drive coupled with the fourth step member, the drive assembly selectively operable to move the step members independently of one another in a first mode to thereby move workpieces of a first size and to move the first and second step members as a first unit and the third and fourth step members as a second unit to thereby move workpieces of a larger second size.

2. The workpiece singulator of claim 1, further including a programmable logic controller PLC) operatively coupled with the drive assembly.

3. The workpiece singulator of claim 2, wherein one or more of the drives is a hydraulic positioning cylinder.

4. The workpiece singulator of claim 2, further including a sensor operatively coupled with the PLC and configured to detect the workpieces, the controller operable to control the first and second drives based at least on data from the sensor.

5. The workpiece singulator of claim 2, wherein the first step member is a first platform and the second step member is a second platform.

6. The workpiece singulator of claim 5, wherein the step members have workpiece support surfaces that are inclined relative to a horizontal plane, such that a first end that is distal to a next consecutive stair is raised relative to an opposite second end that is proximal to the next consecutive stair.

7. The workpiece singulator of claim 5, wherein the third step member includes a third platform and the fourth step member includes a fourth platform, and the third platform is disposed between the first platform and the fourth platform.

8. The workpiece singulator of claim 7, wherein the drive system is selectively operable to move each of the platforms independently of the other platforms.

9. The workpiece singulator of claim 2, wherein one or more of the drives is an electric or pneumatic cylinder.

10. The workpiece singulator of claim 2, wherein one or more of the drives is a rotary actuator.

11. A method of singulating workpieces of various sizes on a set of movable stairs, wherein the set of movable stairs includes a first movable stair that includes a first step member and a second step member that are movable along generally parallel paths between a first level and a second level, a second movable stair that includes a third step member and a fourth step member that are movable along generally parallel paths between the second level and a third level, and a first, a second, a third, and a fourth drive, each of the drives operatively coupled with a corresponding one of the step members, the method comprising:

operating the first and second drives to move the first and second step members synchronously as a unit to thereby transport a first workpiece from the first level to the second level on the first and second step members; and operating the third and fourth drives synchronously as a unit to thereby transport the workpiece from the second level to the third level, wherein the second step member is disposed between the first and third step members.

12. The method of claim 11, wherein the method further includes controlling the first and second step members based at least on the size of the workpiece.

13. The method of claim 12, further including:

operating the first and second drives to move the first and second step members asynchronously to thereby transport a second workpiece from the first level to the second level on the first and second step members, such that the first step member moves the second workpiece from the first level to the second step member, and the second step member moves the second workpiece from the first step member to the second level; and operating the third and fourth drives asynchronously to thereby transport the workpiece from the second level to the third level, such that the third step member moves the second workpiece from the second level to the fourth step member and the fourth step member moves the second workpiece from the third step member to the third level.

14. The method of claim 12, further including detecting the size of the workpiece prior to moving the first step member to the first level.

15. The method of claim 11, wherein the first step member includes a first platform and the second step member includes a second platform, the second platform is disposed between the first platform and the second movable stair, and the step members have workpiece support surfaces that are inclined relative to a horizontal plane, such that a first end that is distal to a next consecutive stair is raised relative to an opposite second end that is proximal to the next consecutive stair.

* * * * *